United States Patent [19]

Rudy

[11] Patent Number: 5,753,061

[45] Date of Patent: May 19, 1998

[54] MULTI-CELLED CUSHION AND METHOD OF ITS MANUFACTURE

[75] Inventor: Marion Franklin Rudy, Northridge, Calif.

[73] Assignee: Robert C. Bogert, Marina Del Rey, Calif.; a part interest

[21] Appl. No.: 462,007

[22] Filed: Jun. 5, 1995

[51] Int. Cl.⁶ .................... A43B 13/20; B32B 3/26; B32B 31/20

[52] U.S. Cl. .................. 156/147; 36/29; 36/30 R; 156/145; 156/292; 428/72

[58] Field of Search ..................... 156/147, 145, 156/290, 292; 36/29, 30 R; 428/69, 72, 178; 137/223, 225

[56] References Cited

U.S. PATENT DOCUMENTS

| D. 234,013 | 12/1974 | Lamarche et al. |
|---|---|---|
| 532,429 | 1/1895 | Rogers. |
| 989,894 | 4/1911 | Byrne. |
| 2,090,881 | 8/1937 | Wilson. |
| 2,575,764 | 11/1951 | Morner ........................ 428/72 |
| 2,600,239 | 6/1952 | Gilbert ......................... 36/153 |
| 2,677,906 | 5/1954 | Reed ............................ 36/28 |
| 2,863,230 | 12/1958 | Cortina. |
| 3,142,599 | 7/1964 | Chavannes. |
| 3,285,793 | 11/1966 | Chavannes. |
| 3,294,387 | 12/1966 | Chavannes. |
| 3,294,389 | 12/1966 | Chavannes. |
| 3,392,081 | 7/1968 | Chavannes. |
| 3,415,711 | 12/1968 | Chavannes. |
| 3,508,992 | 4/1970 | Chavannes. |
| 3,514,362 | 5/1970 | Chavannes. |
| 3,524,787 | 8/1970 | Chavannes. |
| 3,586,565 | 6/1971 | Fielding. |
| 3,589,037 | 6/1971 | Gallagher. |
| 3,616,155 | 10/1971 | Chavannes. |
| 3,785,899 | 1/1974 | Fielding. |
| 3,795,994 | 3/1974 | Ava ............................. 36/29 |
| 3,868,056 | 2/1975 | Keren. |
| 3,872,511 | 3/1975 | Nichols. |
| 4,049,854 | 9/1977 | Casey .......................... 156/147 |
| 4,905,382 | 3/1990 | Lin. |
| 4,908,962 | 3/1990 | Yung-Mao. |
| 4,999,931 | 3/1991 | Vermeulen. |

(List continued on next page.)

FOREIGN PATENT DOCUMENTS 2460034 6/1976 Germany ......................... 36/29

OTHER PUBLICATIONS

"Berlitz/Agnew Tech Tran" translation of EPO 0094868 (to Freland, published Nov. 23, 1983).

Taiwanese Utility Model No. 33, 544, (published Oct. 16, 1986) Summary of claim, Appln. No. 75,100,322.

Summary of claims, Appln. No. 79,204,346 (published Jan. 11, 1991).

London Underground, advertisement for Doc Martense® shoes Mar. 29, 1993.

Etonic® advertisement, 1991.

Primary Examiner—Daniel Stemmer
Attorney, Agent, or Firm—Fay, Sharpe, Beall Fagan, Minnich & McKee

[57] ABSTRACT

A method for inflating a cushioning devices comprised of at least first and second distinct chambers having an interconnecting passage which provides fluid communication between the chambers. The method comprises either: (1) limiting the volume of at least one of the chambers, filling the chambers with a fluid at a single inflation pressure from a single inflation point and sealing the interconnecting passage, or (2) filling the chambers with a fluid at a single inflation pressure from a single inflation point compressing at least one of the distinct chambers, and sealing the interconnecting passage. The method is particularly suited to manufacture of a footwear cushion comprised of a body of elastomeric material having a plurality of sealed non-communicating cells having a single inflation point. At least two cells sharing a single sealed inflation passage are at different pressures.

10 Claims, 13 Drawing Sheets

U.S. PATENT DOCUMENTS

| | | |
|---|---|---|
| 5,042,175 | 8/1991 | Ronen et al. . |
| 5,222,311 | 6/1993 | Lin . |
| 5,222,312 | 6/1993 | Doyle ........................................... 36/29 |
| 5,335,430 | 8/1994 | Fiso et al. . |
| 5,353,459 | 10/1994 | Potter et al. ............................. 156/147 |
| 5,353,523 | 10/1994 | Kilgore et al. . |
| 5,406,719 | 4/1995 | Potter ........................................... 36/29 |
| 5,425,184 | 6/1995 | Lyden et al. ................................. 36/29 |

MULTI-CELLED CUSHION AND METHOD OF ITS MANUFACTURE

BACKGROUND OF THE INVENTION

1. Field of the Invention

The present invention relates to a cushioning device, primarily for use in athletic equipment, comprised of a plurality of individual cells and a method of its manufacture. More particularly, this invention relates to a unique cushion comprised of an elastomeric body having a plurality of fluid filled individual cells, at least two cells being at different pressures. The method of manufacture of the invention provides the ability to form cushions having a plurality of cells at a plurality of pressures from a single fluid insertion point.

The cushion of the invention is particularly well-suited to be used as a portion of a sole in footwear. The cushion is especially beneficial in athletic footwear because the plurality of individual cells at different pressures facilitates the construction of a stable shoe capable of readily absorbing, distributing, and returning the frequent, repetitive, and intense forces experienced in sporting activities. While the invention will be described with particular reference to footwear, the inventive cushion is also recognized as suitable for other sports, and commercial and industrial related applications, including racquet handles, helmets, bicycle seats, gloves, automotive interiors, carpet padding, packaging material, medical and prosthetic devices, mattresses, clothing, braces, etc.

2. Description of the Art

Fluid filled cushions have been in existence for a very long time. U.S. Pat. No. 302,190 (1884), for example, describes one early attempt to fashion pneumatic cushioned footwear. However, until invention of the cushions described in U.S. Pat. Nos. 4,183,156 and 4,219,945, a commercially successful embodiment of fluid containing cushions for footwear was not readily available. These patents describe an inflated insert having multiple intercommunicating gas containing chambers which provide fluid support of the sole of a foot in a comfortable and efficient manner. In fact, these fluid containing cushioning devices are generally considered superior shock absorbing members which protect the bones, muscles, and ligaments of the foot and leg and the various body organs during walking, jumping, and running.

In attempts to improve on the technology disclosed in these patents, it has often been considered an advantage to construct the fluid containing footwear cushion from a plurality of non-communicating chambers. A frequently cited advantage of non-communicating chambers is the continued functionality of the unit upon puncture of an individual chamber. In this regard, Taiwanese Utility Model No. 33,544 describes a stacked arrangement of air cushions having two inflation points to facilitate separate inflation of peripheral air chambers and central air units. In this manner, puncture of one cell does not completely destroy the cushion's functionality.

In addition, it has been recognized that cushions comprised of non-communicating chambers at different pressures provide significant benefits to the wearer. In this regard, the geometry of the foot and the anatomic load support requirements for the foot are constantly changing in any activity that involves foot motion. Regardless of the activity and the change in geometry, there exists an optimum interaction between the foot and footwear which requires both good cushioning and also stabilization of the foot for effective and controlled movements, comfort, and to trigger the body's inherent automatic nerve/muscle proprioceptive reactions.

In general, footwear preferably functions to keep the foot properly and comfortably positioned, stabilized, and minimizes a tendency toward a medial and/or lateral rolling motion. In this regard, it has been recognized as desirable to construct a higher pressured periphery to the cushion to provide lateral stability and a lower pressured central portion, possibly of several inter-communicating cells, to provide greater deflection and shock absorbance.

For example, U.S. Pat. No. 5,353,459 describes a method of inflating a bladder comprised of at least a first and second distinct chamber. The chambers are linked in fluid communication by an interconnecting port with a fluid filled inlet in communication with the first chamber. The method comprises introducing a first pressurized fluid into the inlet to inflate the first and second chambers to a first predetermined pressure. The interconnecting port is then sealed to isolate the first chamber from the second chamber. Thereafter, the pressure is adjusted, the second chamber is pressurized, and the fluid inlet sealed.

Although this design provides a method of constructing a fluid filled cushion having non-communicating chambers at distinct pressures, certain limitations exist. Moreover, the process requires a plurality of pressurization adjustments and sequential sealing of the interconnecting ports to achieve a plurality of chambers at different pressures.

In contrast, the method of the present invention provides the ability to construct a cushion having a plurality of non-communicating cells at a plurality of different pressures in a single inflation step and optionally a single sealing step. In addition, the effectiveness of the method allows construction of a cushion having a significantly more complex geometric arrangement of pressurized cells than has previously been accomplished. Accordingly, a cushion having significantly improved energy return, shock absorbance, stability, durability, and longevity can be economically produced.

SUMMARY OF THE INVENTION

Accordingly, it is a primary object of this invention to provide a new and improved cushioning device and a method for its manufacture.

It is an advantage of the present invention to provide a cushion having a greater resistance to bottoming out, even at low inflation pressures.

A further advantage of the invention is provided by the inventive cushion's exceptional cushioning and technical performance with an elastomeric envelope wall which is very thin.

An advantage of the present inventive method of manufacture is the ability to economically produce an anatomic support which includes area(s) of high deflection potential for greater shock absorbance and area(s) which are more firm for greater stability, without the requirement of mechanical type stabilizing devices, common in the footwear industry.

A further advantage of the present invention and method of its manufacture is provided by the inventive cushion's ability to incur certain punctures or failures of cells without loss of overall cushioning characteristics.

An additional advantage of the inventive method is the ability to produce a cushioning element having a contoured thickness and designed pattern of cell pressures throughout the cushion to match the requirements of a particular sport or an individual's orthotic needs.

The cushion of this invention comprises a body of elastomeric material having at least two sealed individual fluid containing cushioning chambers filled from a single inflation point at a single pressure, at least one of them being pressurized to greater than 0 psi and the chambers being at different pressures.

The invention also provides a method for forming the inventive footwear cushion comprised of forming at least two chambers having an interconnecting passage in an elastomeric body and either: (1) inflating the chambers from a single inlet, while limiting the natural volume of at least one chamber, and then sealing the inlet and interconnecting passage, or (2) inflating the chambers from a single inlet, sealing the inlet, limiting the natural volume of at least one chamber and then sealing the interconnecting passage. As utilized herein the term "natural volume" is intended to mean the unrestricted volume of a chamber at a given pressure when filled with a gas, and the unrestricted volume of a chamber containing a given quantity of fluid when filled with a liquid.

The chambers may be of virtually any size, shape, or thickness, depending on the application, i.e. bubbles, tubes, rectangles, squares, serpentine, herring bone, circular, elliptical, honeycomb, free-form, composite etc. Furthermore, the chambers may have internal "shape-defining" members. These internal shape defining members may be compression supporting, or non-compression supporting components. Similarly, the chambers may have different wall thicknesses or shapes such that the dynamic instantaneous fluid pressures contained therein cause greater elastic deformation and volume change of the chambers in predetermined regions thereby adding additional control to the cushioning characteristics of the device.

BRIEF DESCRIPTION OF THE DRAWINGS

The invention consists in the novel parts, construction, arrangements, combinations, and improvements shown and described. The accompanying drawings, which are incorporated in and constitute a part of this specification, illustrate several embodiments of the invention and, together with the description, serve to explain the principles of the invention.

Of the drawings.

DETAILED DESCRIPTION OF THE INVENTION

Reference will now be made in detail to the present preferred embodiments of the invention. Examples of which are illustrated in the accompanying drawings.

While the invention and inventive process will be described in connection with preferred embodiments and procedures, it will be understood that it is not intended to limit the invention to those embodiments or procedures. On the contrary, it is intended to cover all alternatives, modifications, and equivalents as may be included within the spirit and scope of the invention defined by the appended claims.

Figure 1:
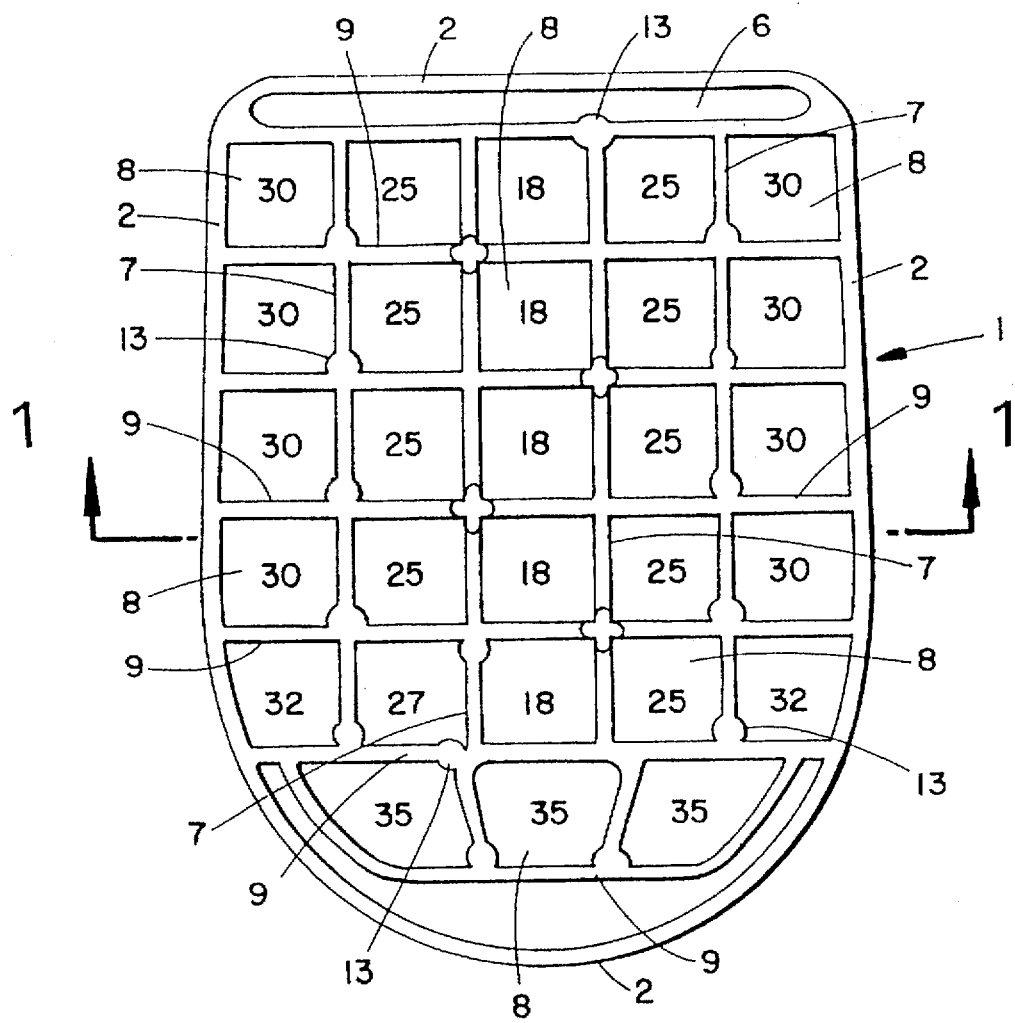
FIG. 1 is a top plan view of a cushion constructed in accord with the teachings of this invention.
Figure 1A:
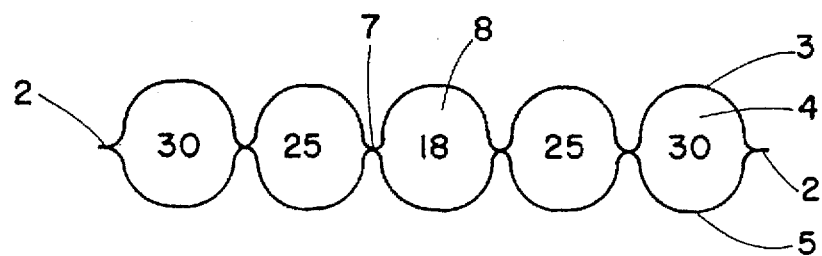
FIG. 1A is a cross-sectional view taken along lines 1—1 of FIG. 1.
Figure 3:
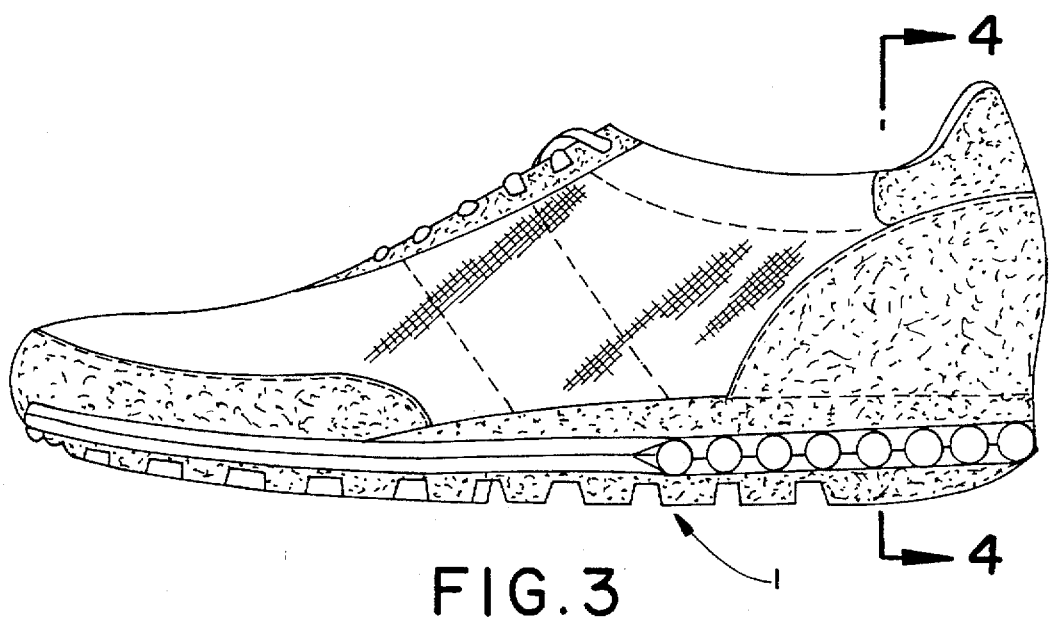
FIG. 3 is a perspective view of a shoe incorporating the inventive cushion.

Referring now to FIGS. 1, 1A and 3, the cushion 1 is demonstrated. As seen in FIG. 3, cushion 1 is particularly suited as a heel ped for an article of footwear. The cushion 1 is formed by sealing together two layers of elastomeric material—top layer 3 and bottom layer 5—in select areas to create the unique cellular structure (See FIG. 1A). Particularly, the cellular structure is formed with a weld pattern comprised of a plurality of generally longitudinal welds 7 and generally transverse welds 9 to form a preformed cushion unit having a plurality of intercommunicating cells 8.

The cushion's general outline is formed by sealing the perimeter 2 of two compatible vacuum formed halves, layers 3 and 5. Of course, the compatible elastomeric halves can also be formed by slush or "lost-wax" casting, rotoforming, blow molding, electro-static powder or vapor deposition, injection molding or any other technique known to those skilled in the art.

Figure 2:
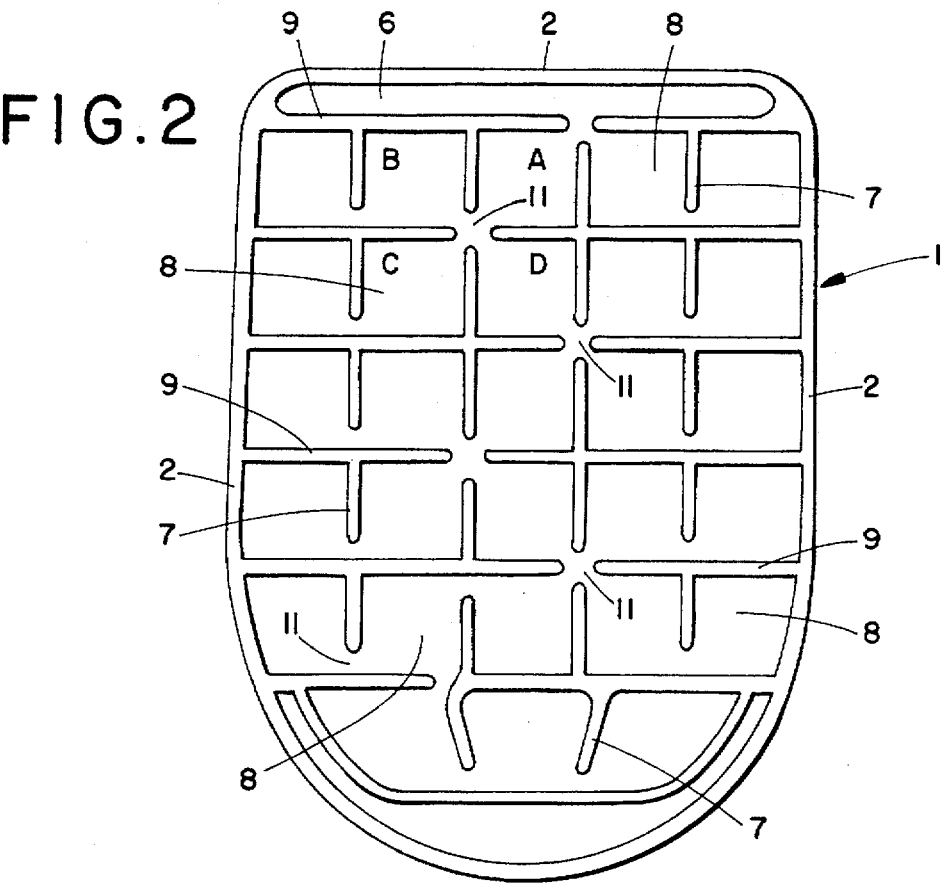
FIG. 2 is a top plan view of an uninflated, unsealed preform elastomeric cushion used in the formation of the cushion of FIG. 1.

As seen in FIG. 2, the preformed unit includes common passages 11 that permit an inflatant medium to flow from one cell to another. It should be noted that passages 11 are often shared by several cells. Particularly, an inflated fluid passing through inflation tube 6 will pass into cell A and common, shared passage 11 facilitates simultaneous inflation of cells B, C, and D with the fluid.

To form the completed cushion having a pattern of inflated cells at various pressures, the preformed unit is filled with a fluid by a needle or nozzle inserted in inflation tube 6, selected cells are compressed to reduce their volume a predetermined amount, and passages are selectively closed, in this instance with welds 13. Optionally, some of the cells can be in communication with one another. Importantly, the pressures of individual cells are custom tailored by this method, more fully described below, to provide an exceptionally stable heel cushion.

Particularly, in the cushion of FIG. 1, the non-communicating cells around the perimeter of the cushion—operating as discrete sealed cells—are inflated to a higher pressure than the cells more centrally located on the longitudinal axis. In this manner, the heel is stabilized by very firm, high pressure cells around the perimeter, and cushioned by the low pressure cells toward the center. This design cups, stabilizes, and cradles the heel, reducing undesirable medial and lateral rolling motions and tendency toward over-pronation and/or excessive supination, or rolling-off of the foot-bed during rapid lateral stops and blocking action—as in tennis.

Figure 4A:
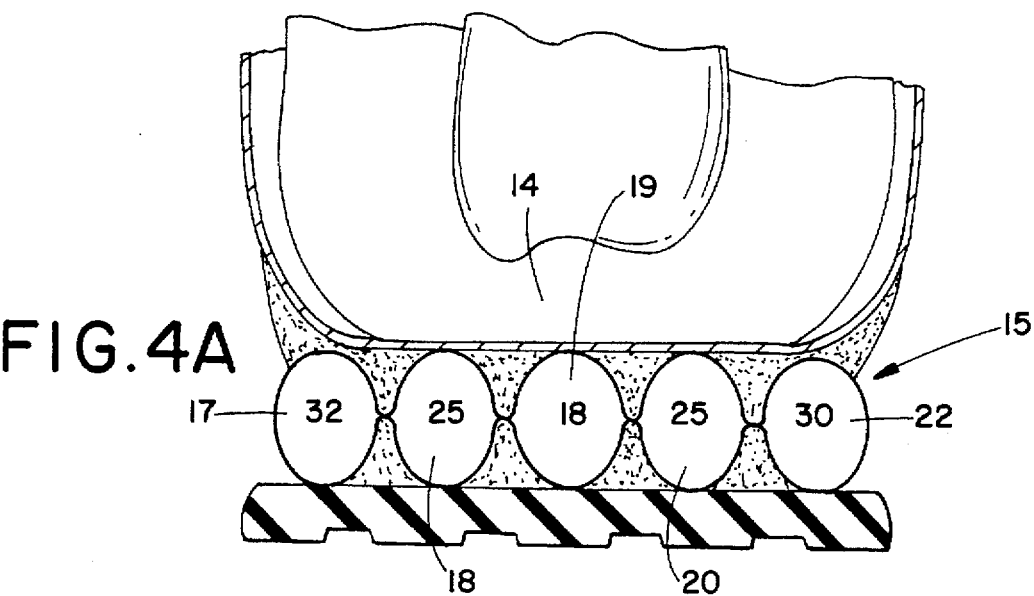
FIGS. 4A–4C are cross-sectional views taken along line 4—4 of FIG. 3 demonstrating the compressive tendencies of the inventive cushion.
Figure 4B:
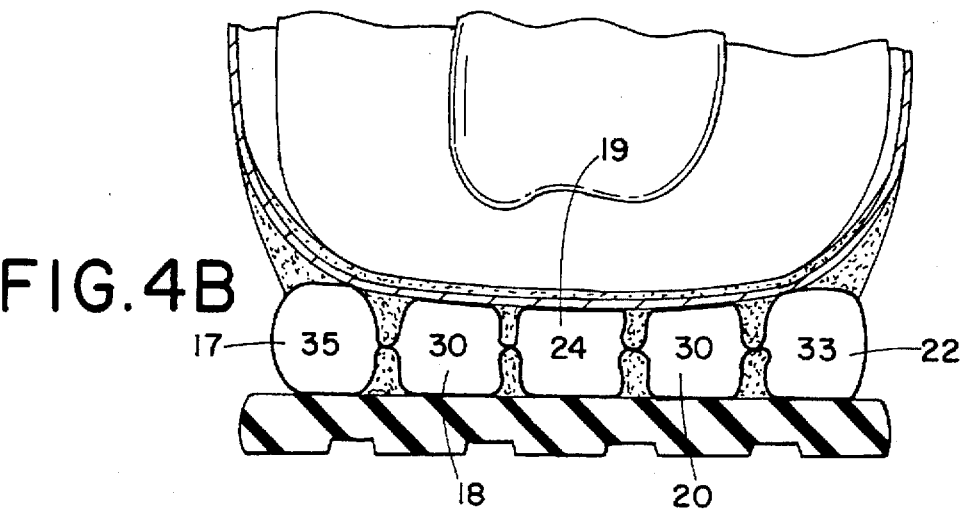
Figure 4C:
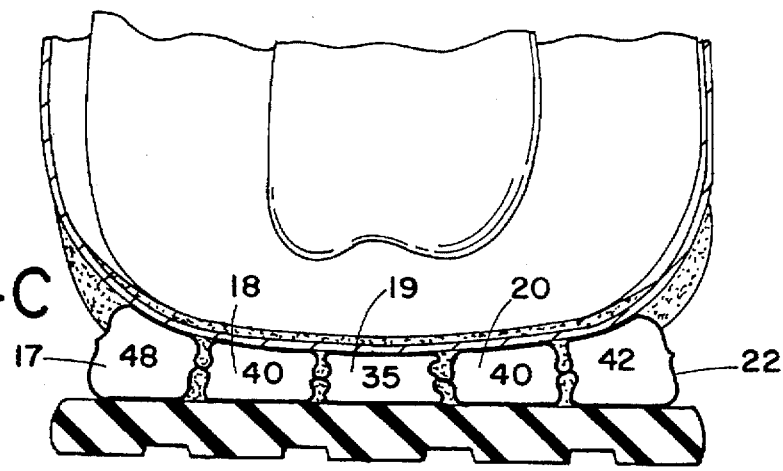

The stabilizing and cupping action of the cushion is particularly well illustrated in FIGS. 4A–4C, which show the heel 14 of a right foot in a shoe equipped with the inventive cushion 15. As is apparent, the outermost cell 17 on the medial side is pressurized to a higher pressure than the next cell inward 18. The center cell 19 is at a still lower pressure. The pressure of cells progressing to the lateral side of the shoe then increases again (See cells 20 and 22). The low pressure of the center cells provides a very comfortable "riding on air" feel, and allows the calcaneus to sink lower into the center portion of the cushion than the outer portion (See FIGS. 4B and 4C). The cupping and cradling action of the device is clearly visible in these drawings. Particularly, cell 19 deflects to the largest extent, cells 18 and 20 to the next largest extent, and cells 17 and 22 the least. Accordingly, a concave, "U"-shaped, stabilizing surface is created under loaded conditions. It is also noted that outer cell 17 on a medial side of the shoe is pressurized to a higher level than outer cell 22 on a lateral side of the shoe. This design provides a beneficial "banked track" effect during the blocking type maneuvers encountered in many sports.

A particular advantage of the inventive cushion of FIG. 1 is the construction of a large quantity of individually pressurized cells which provide the ability for the cushion to function exceptionally well at low pressures. Since the fluid is trapped within a plurality of relatively small volume cells, internal fluid pressure within the cells builds up rapidly, compared to prior art inflated cushions with larger cells having a correspondingly slower pressure increase during compression. Accordingly, the present inventive cushion can operate with lower inflation pressures without bottoming out. These low pressures, combined with the preferred spherical, hemispherical, or semi-spherical shape of the cells, permits the cushion to operate at stress levels within the envelope film which are much lower—perhaps less than half—the stress levels of prior products. Accordingly, unusually thin layers of barrier material, preferably about 0.008" to about 0.030", are suitable for use in the inventive cushion.

As will be apparent upon review of the several cushion embodiments, provided in the Figures, the inventive cushion is unique in the footwear industry, providing a precisely controllable, technically superior and highly versatile means to replace conventional foam midsoles. In addition, the cushion provides the ability to construct footwear having a 360° visible cushion which is particularly beneficial in marketing. Furthermore, the cushion provides even higher level of durability and reliability than that of even successful prior fluid filled products.

It is an important feature of this invention to be able to inflate and seal different pressures or quantities of fluid within different cells or combinations of cells in an expeditious manner, preferably in a single inflation step, so that the cushions can be manufactured rapidly and at a low cost. The novel inflation technique of this invention permits construction of the inventive multi-chambered cushioning device having a variety of different pressures, in a rapid, inexpensive, and reliable manner by filling a plurality of cells at a single pressure from a single point, rather than a multiplicity of points or pressures.

Thus, a cushioning device for footwear can be easily customized in the manufacturing process to provide a unique range of sport specific, or user specific products. For example, a mid-sole cushioning device could have the individual chambers within the overall load supportive area programmed in the manufacturing process to achieve an optimized dynamic balance between the key factors such as (a) cushioning, (b) heel stability, (c) mid-foot stability, (d) forefoot stability, (e) pronators, (f) supinators, (g) special medical orthotic support/cushioning requirements, (h) desirable heel strike to forefoot "toe off" propulsion rolling action. Therefore, the mid-sole cushioning device could be uniquely customized to specifically fill the technical performance, comfort-cushioning, and energy return requirements for a wide variety of activities such as running, jumping, tennis, soccer, triple jumping, volley ball, rugby, walking, standing, dancing, golf, aerobics, hiking, etc.

Although the inventive cushion and method of manufacture is a significant improvement, the present invention can also beneficially incorporate many aspects of prior footwear and cushion construction techniques, including many of the materials utilized therein. Accordingly, U.S. Pat. Nos. 3,005,272; 3,685,176; 3,760,056; 4,183,156; 4,217,705; 4,219,945; 4,271,706; 4,287,250; 4,297,797; 4,340,626; 4,370,754; 4,471,538; 4,486,901; 4,506,460; 4,724,627; 4,779,359; 4,817,304; 4,829,682; 4,864,737; 4,864,738; 4,906,502; 4,936,029; 5,042,176; 5,083,361; 5,097,607; 5,155,927; 5,228,217; 5,235,715; 5,245,766; 5,283,963 ; 5,315,769; and, 5,353,459, are herein incorporated by reference.

Preferred fluids used to fill the inventive cushion are captive gases such as nitrogen and non-polar large molecules, alone or in combination with air. The device can be self-inflating via diffusion pumping or mechanically inflated. Large molecule gases which have been found particularly suitable include the following: hexafluoroethane; sulfur hexafluorides; perfluoropropanes; perfluorobutanes; perfluoropentanes; perfluorohexanes; perfluoroheptane; octafluorocylcobutane; perfluorocyclobutanes; hexafluoropropylene; tetrafluoromethane; monochloropentafluoroethane; 1,2-dichlorotetra-fluoroethane; 1,1,2-trichloro-1,2,2-trifluoroethane; chlorotrifluoroethylene; bromotrifluoromethane; and, monochlorotrifluoromethane. Two preferred gasses within this group are hexafluoroethane and sulfurhexafluoride.

Also considered as suitable fluids with which to fill the elastomeric body are incompressible fluids such as water, semi-gel liquids, oils, grease, soft or liquid wax, glycerine, soft soap, silicones, rheopexic fluids, thixotropic fluids, and corn syrups which exemplify but do not limit the types of acceptable incompressible liquids. In addition, the inventive cushion can include a combination of compressible gases and incompressible liquids.

When incompressible liquids are the only fluid used to fill a cell, the predominate description of "pressure" utilized throughout this application is more precisely equated to the maximum volume of a cell relative to expansion (stretching) of the elastomeric material from which it is formed. Moreover, a cell which is only partially filled, is considered a low pressure embodiment, whereas a cell which is filled to the point where the elastomeric material of the envelope is elastically expanded, is considered high pressured.

The flexible elastomeric body is preferably comprised of elastomeric materials selected from: high percentage nitrile rubber, halogenated butyl rubber, polyurethane, polyester elastomer, fluoroelastomer, chlorinated polyethylene, polyvinyl chloride, chlorosulfonated polyethylene, polyethylene/ethylene vinyl acetate copolymer, neoprene, butadiene acrylonitrile rubber, butadiene styrene rubber, ethylene propylene polymer, natural rubber, high strength silicone rubber, low density polyethylene, adduct rubber, sulfide rubber, methyl rubber, and thermoplastic rubber. Polyurethane is a particularly preferred material for construction of the barrier. When a crystallographic gas barrier is desired, the elastomeric material can be constructed to include crystalline polyester, nylon, propylene, graphite, glass, Kevlar, vapor or sputtering deposited metals, dielectric metal oxides and mica. These materials and others known to those skilled in the art are selected to reduce the captive gas, for example nitrogen, diffusion through the elastomeric walls of the cushion.

Figure 5:
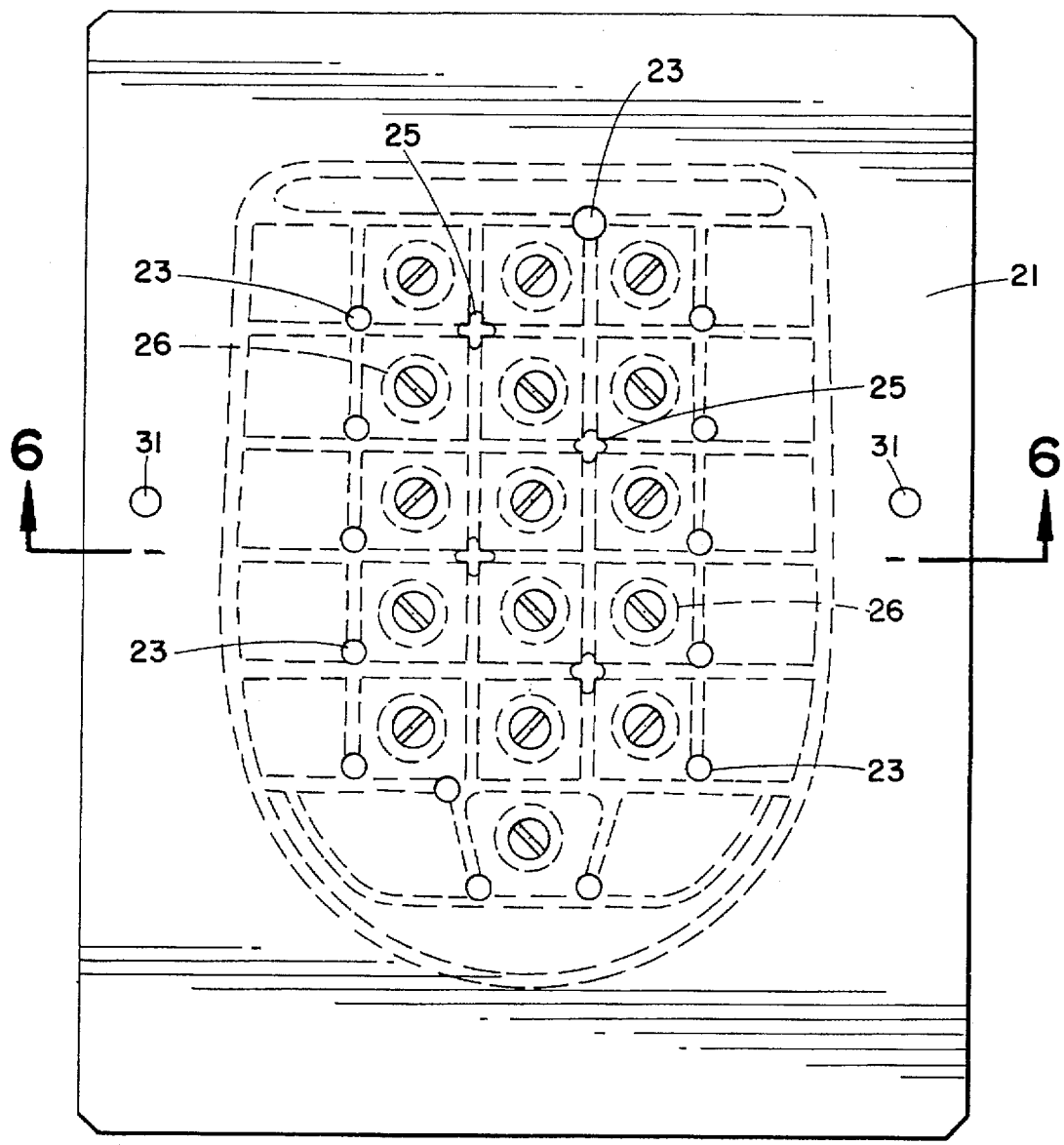
FIG. 5 is a top plan view of a die member used in the inventive method, dashed lines demonstrating the relative position of a preformed cushion.

An exemplary method of constructing the inventive cushion is described by referring to FIG. 5, FIGS. 6A–6C and FIG. 7. FIG. 5 is a plan view of a die 21 (typically constructed of aluminum or brass) including RF welding electrode insertion sites 23 and 25. In this example, small circular electrodes 23a and cruciform electrodes 25a are used to seal-off selected communicating passages (See 11 of FIG. 2) between the cells. The outline of the preformed cushion 1 (FIG. 2) is portrayed by dotted lines. Die 21 also includes dielectric inserts 26, preferably comprised of micarta, fiberglass, Kel-F, Teflon, phenolics, etc.

In this embodiment, cushion 1 is first inflated to a pre-determined preform pressure through inflation tube 6 which is then sealed. Next, the cushion is nestled into the recesses 27 of base plate 29 to properly align the sealing electrode sites. The die of FIG. 5 is then placed over the cushion and aligned by means of guide pins 31 on the base plate 29.

To assure alignment, recesses 27 in base plate 29 accept the widest portions of the uninflated preformed unit and allow sufficient room for the cells to expand when individual cells change pressure and accordingly volume.

An alternative manner in which to assure alignment is to punch registration holes in the perimeter of the elastomeric body. These registration holes can be aligned over pins in the base plate of the inflation die assembly. Such an approach is particularly expeditious when the cushion is comprised of a first flat side and a second cellular side (See FIGS. 15) because a flat part is difficult to position.

Figure 6A:
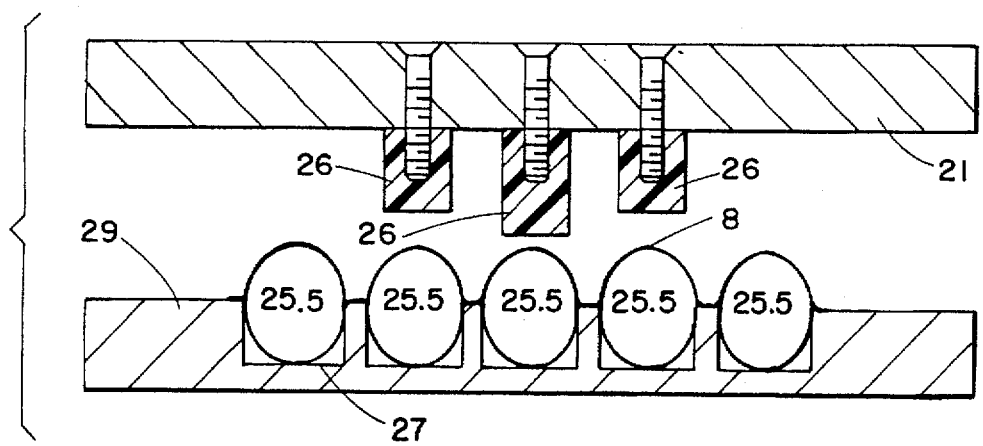
FIGS. 6A–6C are cross sectional views of the die unit of FIG. 5 taken along lines 6—6 demonstrating the function of the die unit.
Figure 6B:
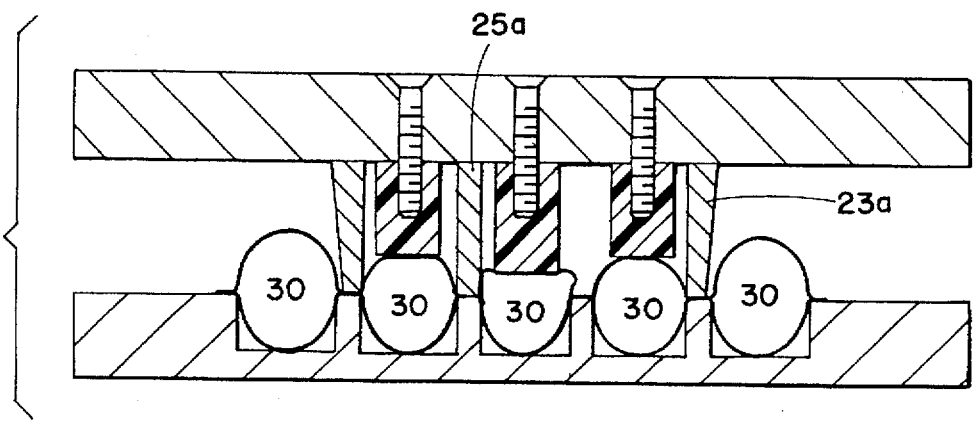
Figure 6C:
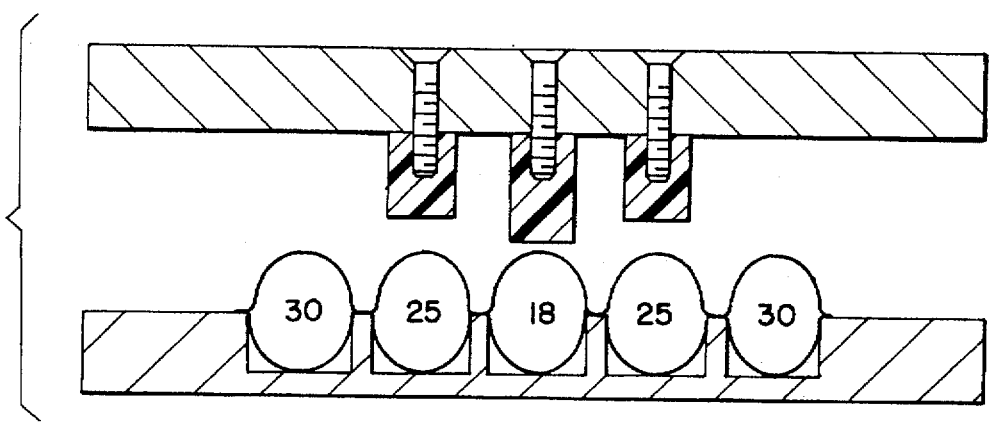
Figure 7:
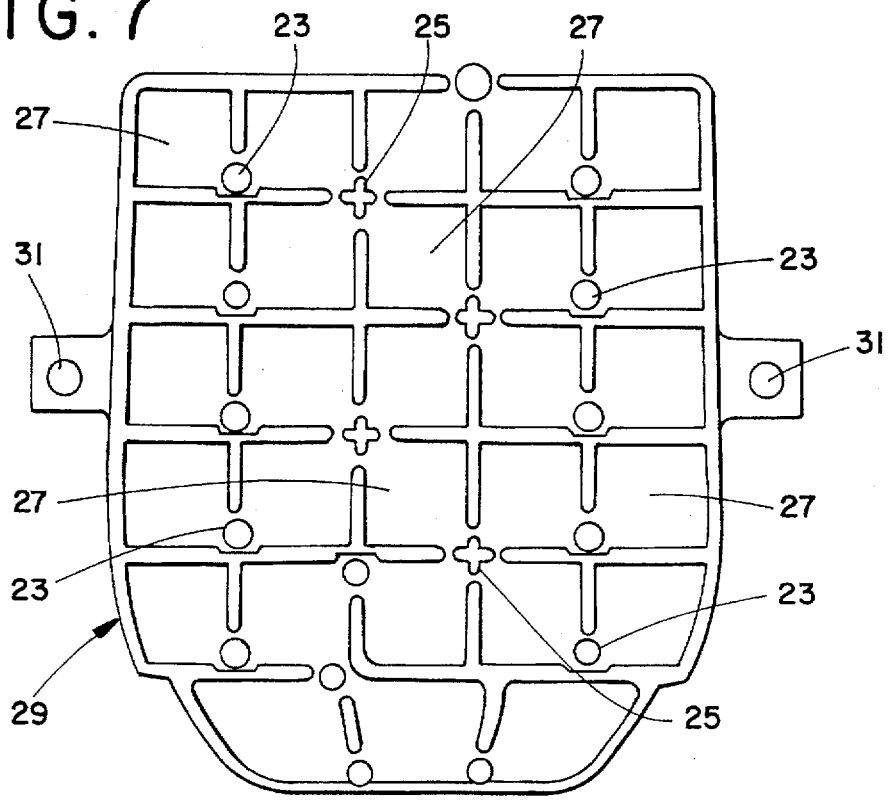
FIGS. 7 is a die member having a recessed working face, compatible with the die member of FIG. 5 to provide matching chamber halves, particularly appropriate when forming spherical chambers.

Referring particularly to FIGS. 6A–6C, the adjustable pads or blocks 26 preferably comprised of a dielectric material, are provided within the inner cavities of the die 21 to compress individual cells 8 by various pre-determined amounts. While held in a compressed state, the welding electrodes 23a and 25a are inserted through die 21 (and optionally die 29) to seal select communicating passages (11 of FIG. 2) in the preformed cushion.

The welding electrodes can be any shape, for example circular rectangular or cruciform in cross-section, provided they can seal off the selected passages. Furthermore, although the method disclosed in this embodiment employs RF welding electrodes, those skilled in the art will recognize the ability to use other impulse electric heat sealing mechanisms, electromagnetic, ultrasonic, laser, and/or chemical sealing procedures, etc.

As is seen most clearly in FIGS. 6A–6C, the blocks 26 change the volume and, therefore, also the starting preform pressure throughout the individual cells. Moreover, inflatant fluid is forced to other cells, thus creating a new maximum pressure throughout all cells or chambers. Since the RF welding electrodes seal the cells in this state (FIG. 6B), the cushion, when removed from the compressive state, with cells expanded to their uncompressed free standing volume (i.e. natural volume), have pressures in the selected compressed cells reduced to the desired pre-determined level and uncompressed cells at a higher pressure than in the preform. In this way, any pattern of sealed pressures within the various cells can be achieved.

Moreover, it is determined beforehand what the maximum pressure in the inflated cushion should be, as well as what the various compressed (reduced) volumes of individual cells should be, so that, when the cells are sealed and subsequently allowed to return to their full, free standing volumes, the final pressures in each of the individual compressed cells will drop to the desired value. Cells that were allowed to expand without any constraint, prior to sealing-off of the inflation passage would stay at the maximum pressure level achieved, at the time the communication passages were sealed off.

Figure 13A:
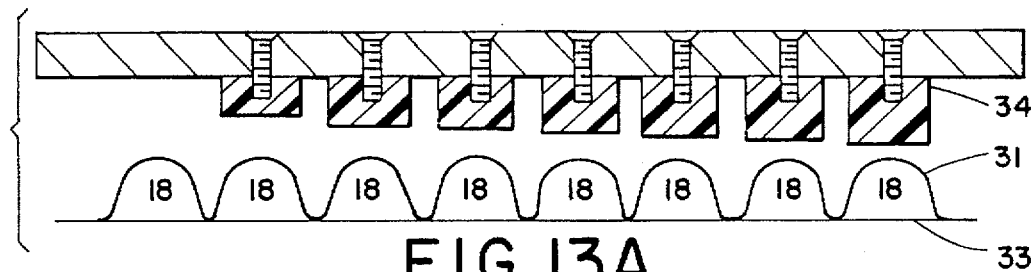
FIG. 13A–13C are diagrammatic views of a method of constructing a variable pressured cushion when starting with a preformed inflated and sealed cushion having intercommunicating chambers.
Figure 13B:
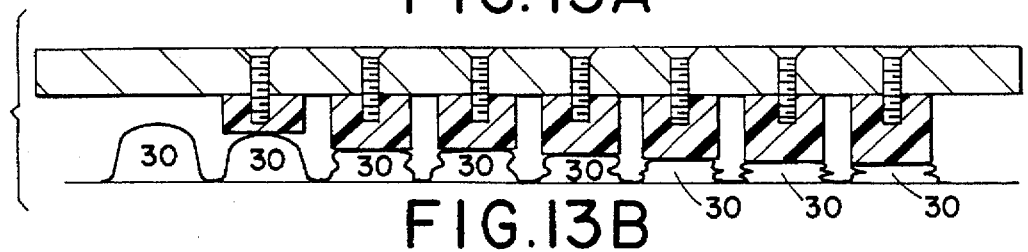
Figure 13C:
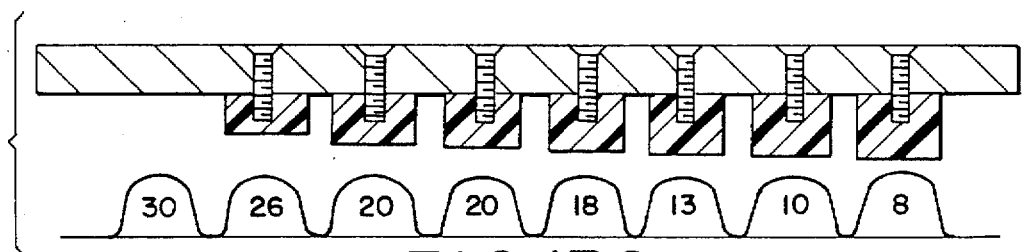

FIGS. 13A–13C and 14A–14C exemplify the distinction of inflating first and then tailoring the cellular pressures versus tailoring the cellular volumes and then inflating to the desired maximum incremental chamber pressure. Particularly, FIGS. 13A–13C depict two sheets of elastomeric material 31 and 33 formed into cushion 35 and pre-pressurized to pre-determined 18 psi intermediate pressure level. The cushion remain in place in to a die unit 34. While all of the chambers remain in fluid communication with one another, die 34 is lowered and pressurized, cell. Thus, the total volume of the entire interconnected group of cells is reduced, and the fluid pressure throughout the assembly is proportionally increased in accordance with Charles Gas law, $P_1 V_1/T_1 = P_2 V_2/T_2$, to a new pre-determined level (FIG. 13B) While compressed, the appropriate passages are sealed with electrodes to form a finished cushion having a plurality of chambers with controlled different pressures (FIG. 13C) after removal from the die assembly.

Figure 14A:
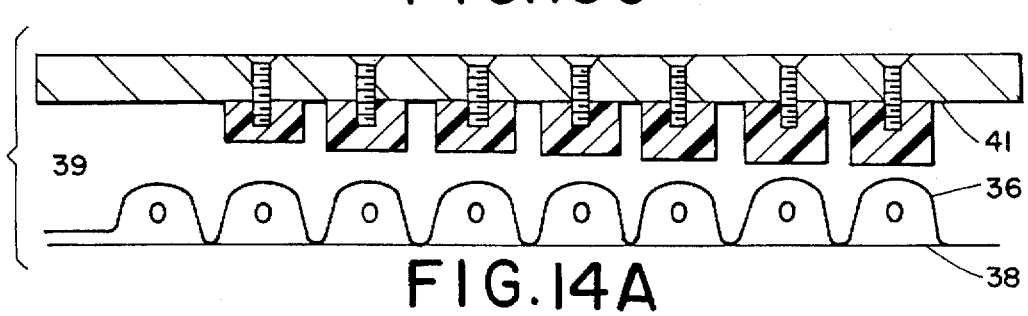
FIG. 14A–14C are diagrammatic views of an alternative method of constructing a variable pressured cushion when starting with an uninflated preform having only chamber outline formed.
Figure 14B:
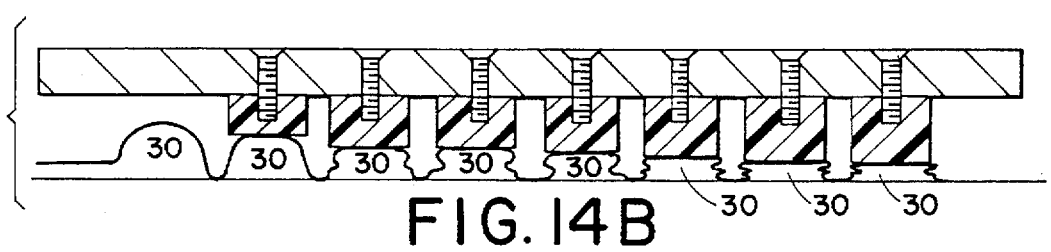
Figure 14C:
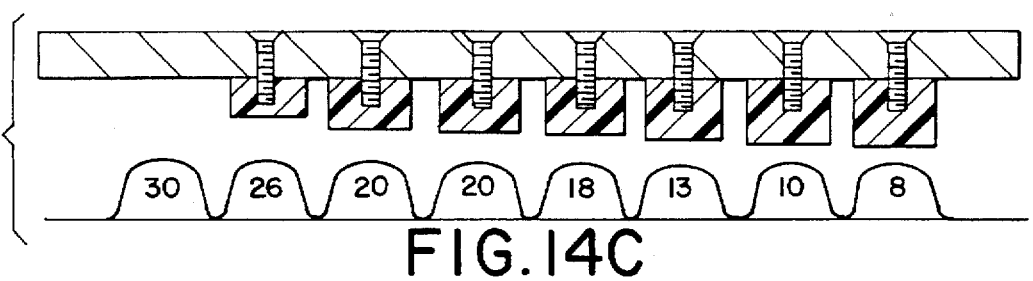
Figure 16:
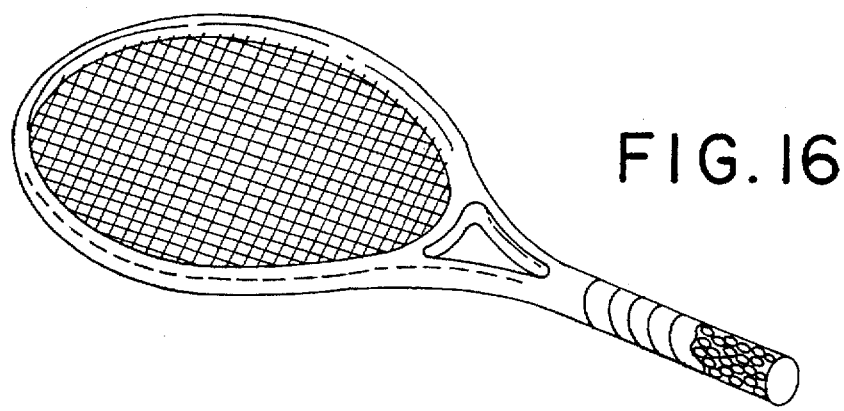
FIG. 16 is a cross-sectional view of a tennis racquet including the inventive cushion as a dampening insert in the handle.
Figure 17:
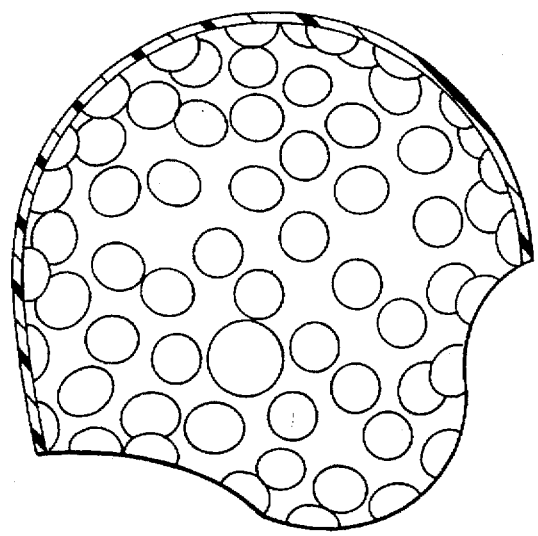
FIG. 17 is a cross-sectional view of a football helmet including the inventive cushion as a protection lining.
Figure 21:
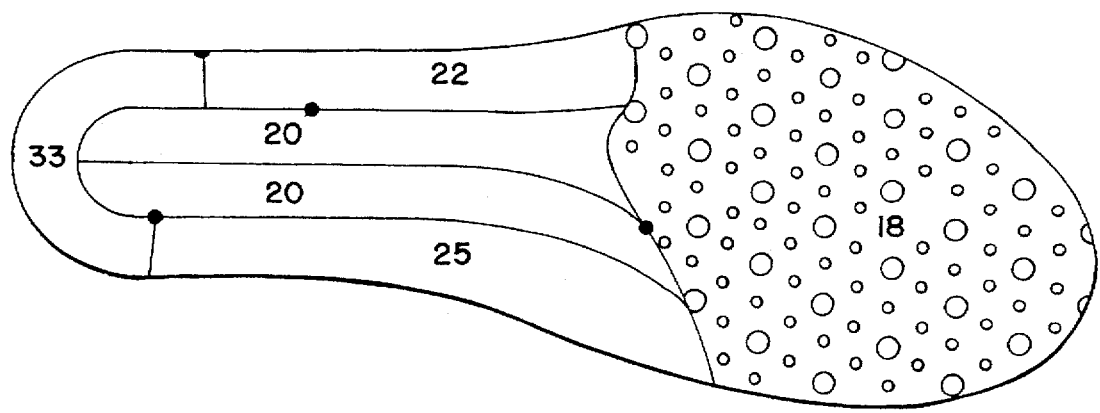
FIG. 21 is a further alternative footwear cushion in accord with the present invention.
Figure 18:
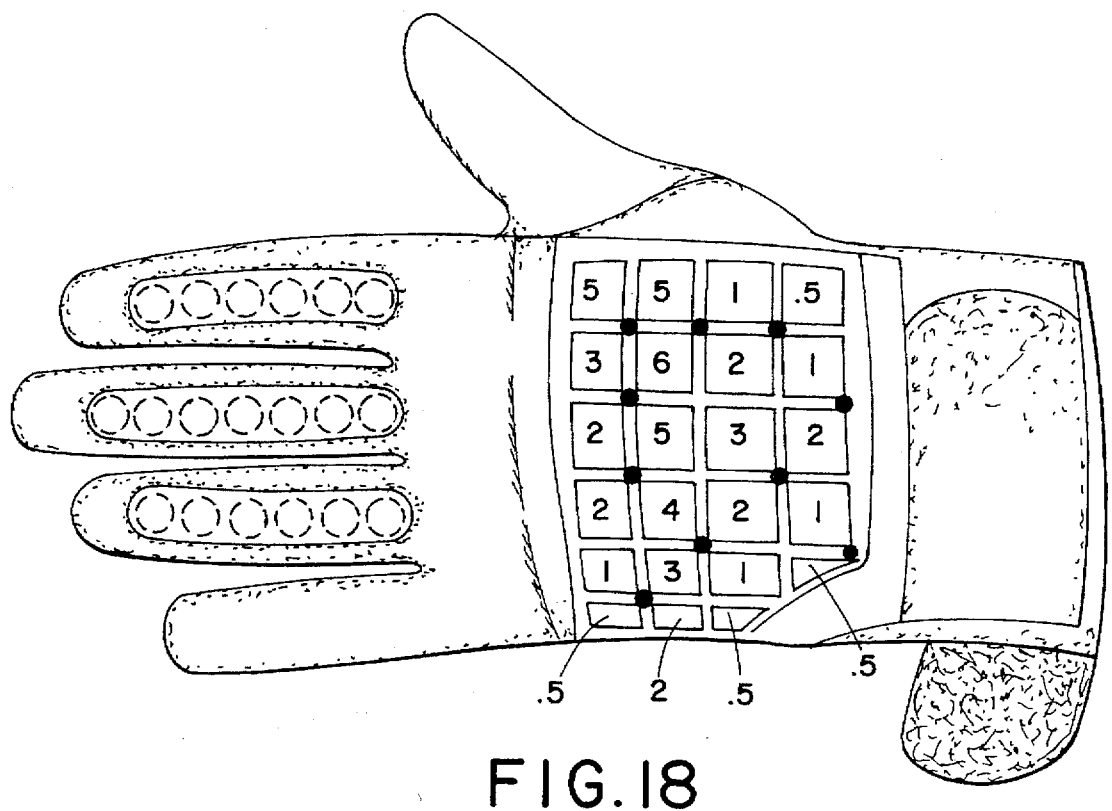
FIG. 18 is a perspective view of a glove incorporating the inventive design.
Figure 19:
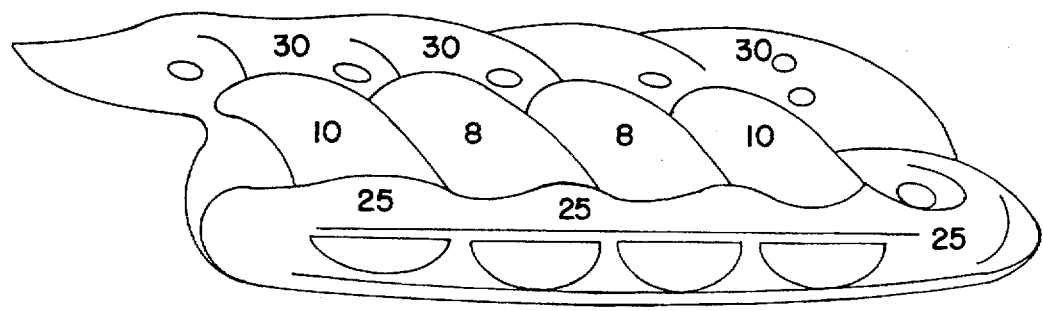
FIG. 19 is a perspective view of an alternative heel ped of the invention design.
Figure 20:
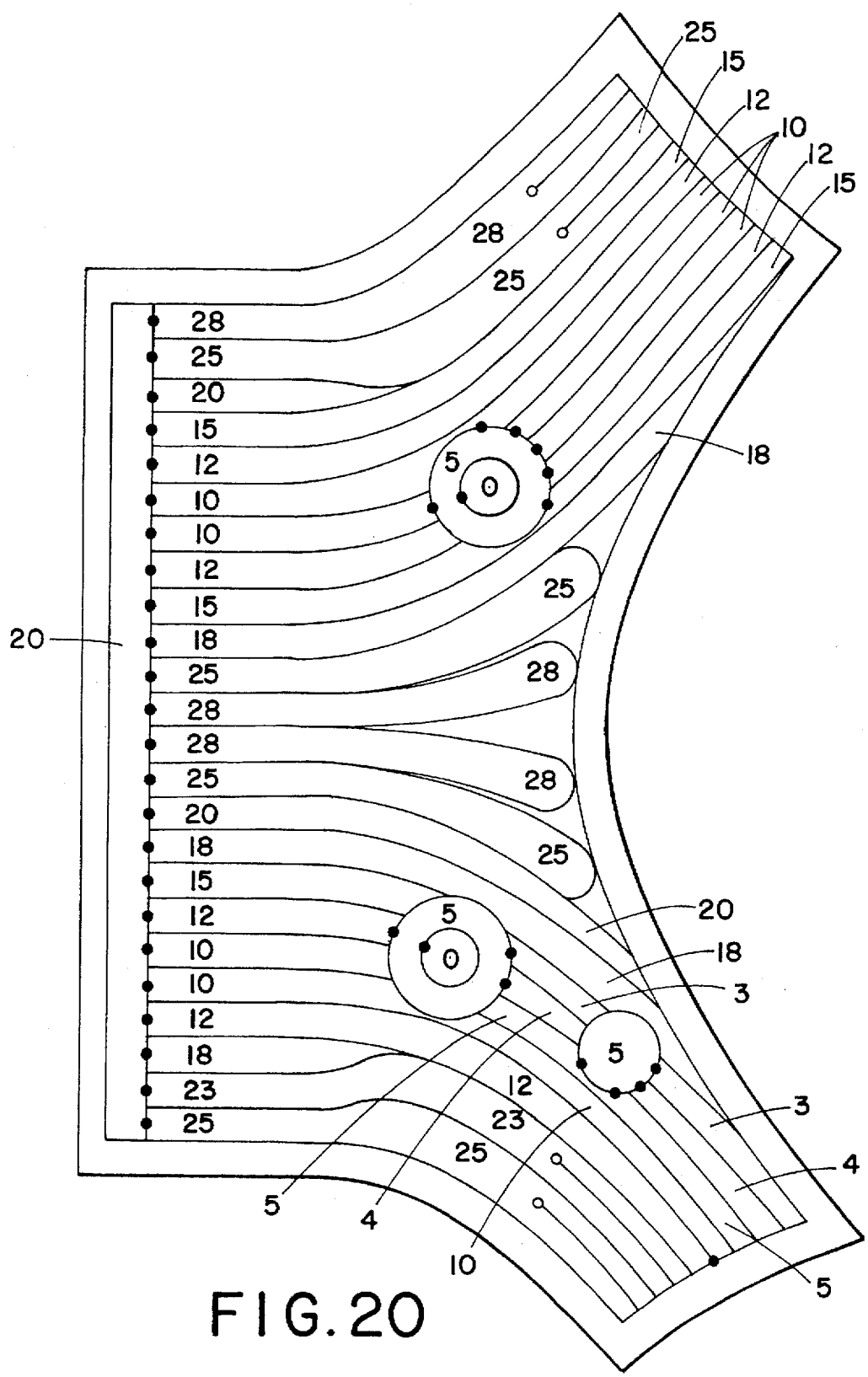
FIG. 20 is a top plan view of a brace designed in accord with the present invention.

FIGS. 14A–14C exemplify a procedure in which two sheets the elastomeric material 36 and 38 are formed into uninflated cushion 39. The cushion is then placed into a die unit 41. The die inserts then restrict the natural volume of the interconnected cells, the volume restricted cushion is inflated, and the appropriate passages are sealed. The finished cushion is accordingly comprised of a plurality of cells, pressurized at pre-determined different pressures.

Alternatively, the cushion can be produced in a "single" step operation by completing all steps of construction in the die. Particularly, rather than form a "preform" cushion which is inflated and sealed in the die, the cushion can also be constructed in the die. Moreover, there is no requirement to construct a preform elastomeric body. Particularly, an elastomeric body can be formed into a 3-D cellular configuration in the die (or re-entry to soften the film, and pressure and/or vacuum forming to expand the film into the die cavity) and inflated while reducing the volume of selected cells, then sealing the appropriate passages to achieve cells of the desired thickness, size, geometry, and pressures.

In this case, the weld lines to form the cellular structure are not necessarily formed prior to inflation. Particularly, a two position heat-sealing die can be used. In the first position, the die forms cells with compressive force, the cell volume is adjusted and the unit inflated or vice-versa. Thereafter, the weld lines, held temporarily closed by compressive force, and inflation passages are sealed with electrodes and the formed multi-pressure chamber cushion is removed from the die.

Figure 8:
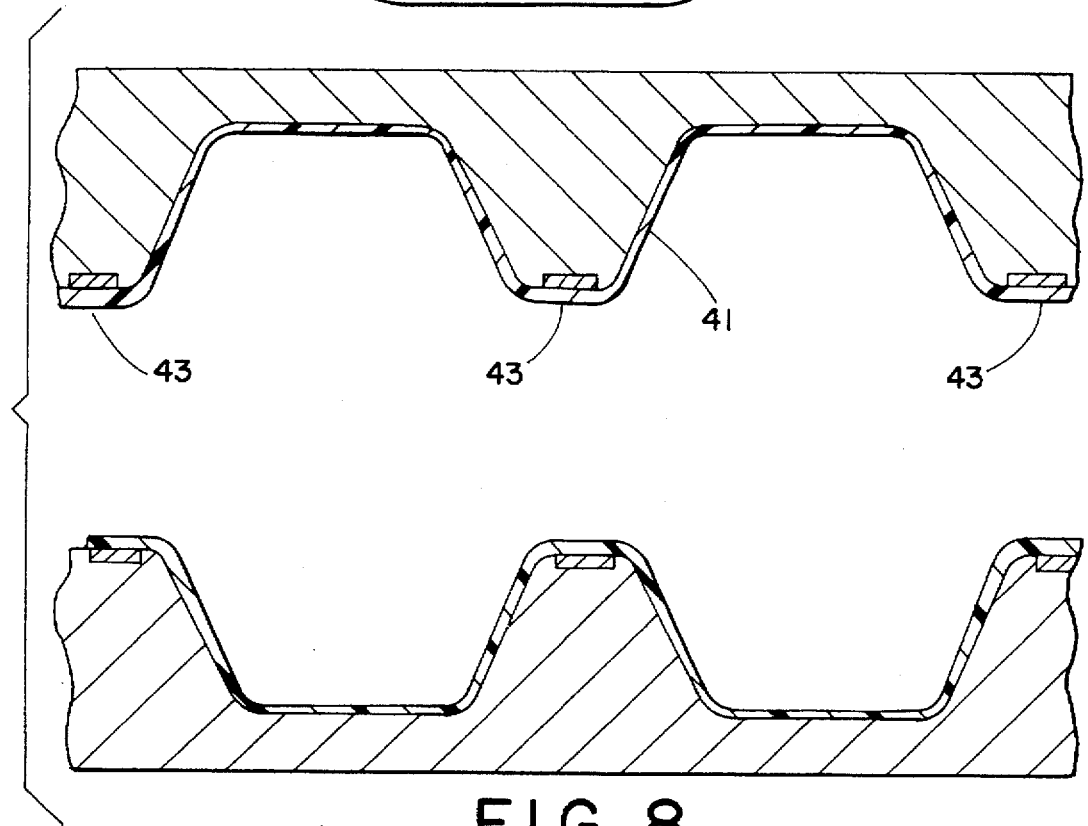
FIG. 8 is a cross-sectional view of a preferred female mold used in forming the inventive cushion.
Figure 9:
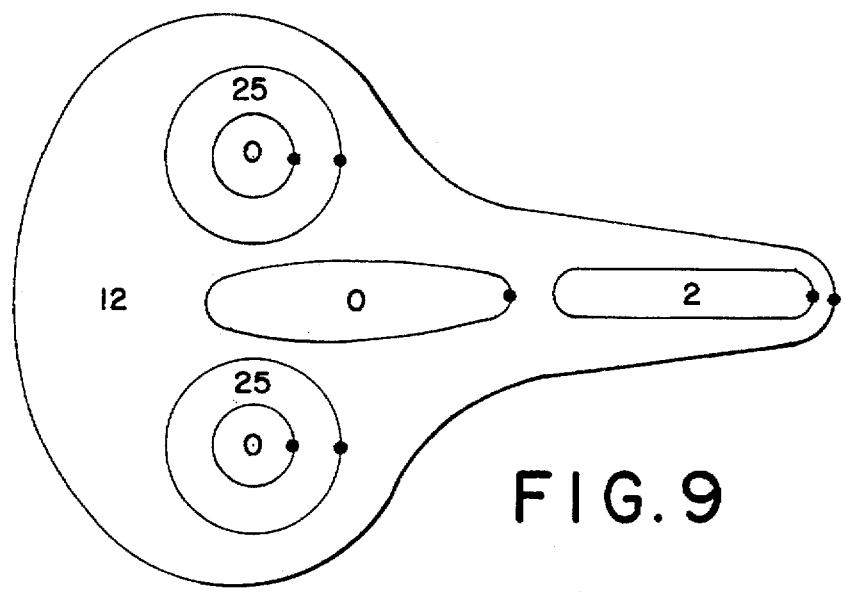
FIG. 9 is a top plan view of a bicycle seat incorporating the inventive cushion.

A preferred female mold for forming the elastomeric body cells in a die—i.e. avoiding the step of constructing a preformed unit—is illustrated in FIG. 8. The elastomeric material can be vacuum formed or blow molded into the die structure.

Blow molding of the pre-formed, three dimensional multi-chambered device can be done in the manner familiar to those skilled in the art, i.e. a parison or bubble of semi-molten highly viscous elastomer is blown. When the bubble is of the desired size and wall thickness, a dual female chambered mold is clamped around the bubble, pushing selected opposing walls of the bubble together, creating strong junctures where the semi-molten walls are squeezed together. The gas pressure within the parison is concurrently adjusted upward to push the unsupported semi-molten walls of the bubble to fill the cavities in the die. Thereafter, the part is allowed to cool, the inventive cellular pressurization procedure described herein is applied, and the cushion is then rejected from the die.

In either the blow molding process described above or a vacuum forming procedure well known to those skilled in the art, the female mold is preferred because the tapered shape of the mold creates the thickest region of the drawn film 41 between each cell, in the weld area 43. Since this is the welded area, the flex fatigue life of the part when subjected to cyclical compressive loading is improved. Preferably, the taper is at least 10% of the nominal wall thickness of the film. The film is thickest and best able to resist buckling near the region of the weld. It is in this region where almost all fatigue cracking of the film and subsequent fatigue failures occur in conventional air cushions. In addition, the taper in the side walls of the inflated cells controls the bending and buckling of the side walls in an advantageous manner so as to reduce the degree of localized folding action and the sharpness of the bends in the film.

It is the job of a good cushioning product to provide good energy return (resilience) simultaneously while providing superior cushioning in addition to the other technical and performance characteristics previously stated. The present Invention provides superior cushioning. Because the fluid medium can be sealed within individual cells, no energy is lost due to the inflatant moving around. In addition, all of the impact shock energy is absorbed and efficiently stored in a diabatic compression of the trapped gas and the elastic deformation of the elastomeric envelope film.

It has been a fundamental unfulfilled goal in the design of various types of cushioning devices and products, to customize the load/deflection characteristics of those products to match the incremental, site specific load/deflection function needed throughout the load bearing area of the device. Many good and functional techniques have been devised an are in common use. Various types of foam, elastomeric rubber, captive gas and captive liquid systems are available in the market. However, they all function by averaging-out the incremental "site-specific" cushioning of technical requirements of the product. For example, in the mid-sole of certain athletic shoes, the manufacturer layers several different density, wedge-shaped foam elements to achieve softer cushioning in one area and a more firm support in another area. Some gas and fluid systems do this by having two or more large bags filled with a fluid with one or two flow restrictive passages or one way check valves provided between the bags. The present invention solves these problems in a very unique, expeditious, simple, cost effective and highly useful manner. Thus an almost limitless spectrum of news beneficial, and cost competitive products are easily attainable.

FIGS. 10–12, 19 and 21 describe alternate footwear embodiments of the inventive cushion. Particularly, the cushions can be constructed with different cell sizes and/or pressure levels. For example, higher pressures can be introduced into the perimeter cells and lower pressures in center cells, to achieve the general shape of FIG. 10A. This provides a helpful cupping configuration. If it is desired that this cushion be flat on the bottom, it can be foam encapsulated to give the FIG. 10B configuration.

The elastomeric encapsulating foam is usually a polyurethane foam, a polyvinyl acetate foam, or a "PHYLON" type material. In some cases, however, a slow-memory, high hysterisis foam can be used to slow down the energy return from the energy cells and to provide a degree of molding/contouring of the foam to match the contour of the bottom of the foot.

Figure 10A:
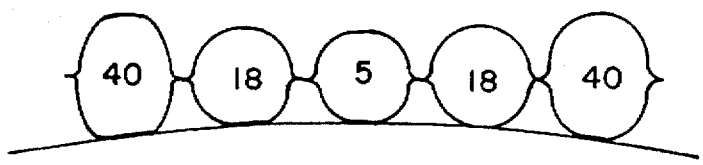
FIGS. 10A–10E are cross-sectional views of exemplary cushion designs prepared according to the inventive method.
Figure 10B:
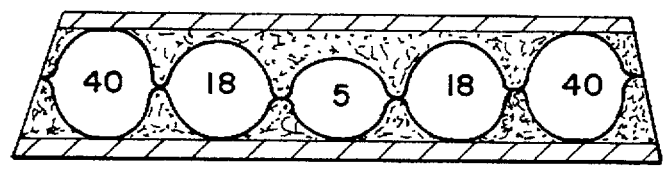
Figure 10C:
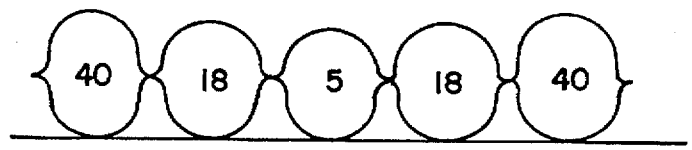

A similar shape can be achieved, as in FIG. 10C, by configuring the uninflated pre-formed bottom portion so that individual cells expand a different amounts when pressurized to provide a flat bottom. Moreover, cells at different pressures can be formed of different elastomeric thicknesses to expand to same size and shape in spite of the fact that various cells have significantly different internal pressures.

Figure 10D:
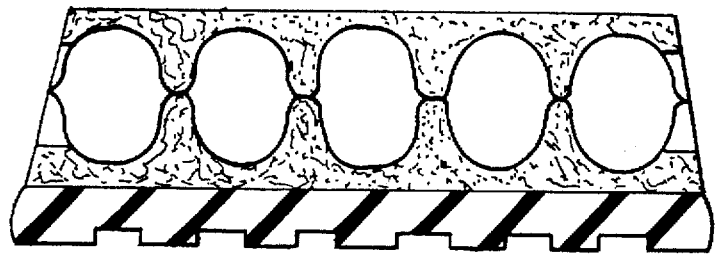
Figure 10E:
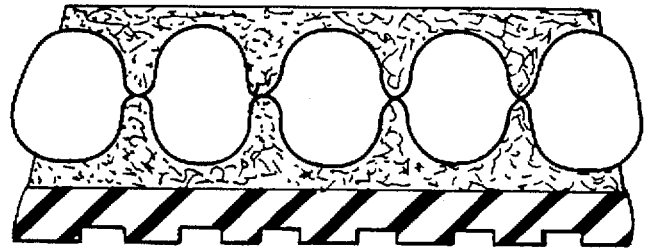

A foam encapsulated version of the FIG. 1 cushion is shown in FIG. 10D. In FIG. 10D, recesses are formed in the molded side walls of the midsole to expose the individual cells of the cushion. In FIG. 10E, the outer most cell, actually protrude beyond the foamed side walls of the midsole. This visible cushion enhances market appeal of the finished product.

Figures 11, 12:
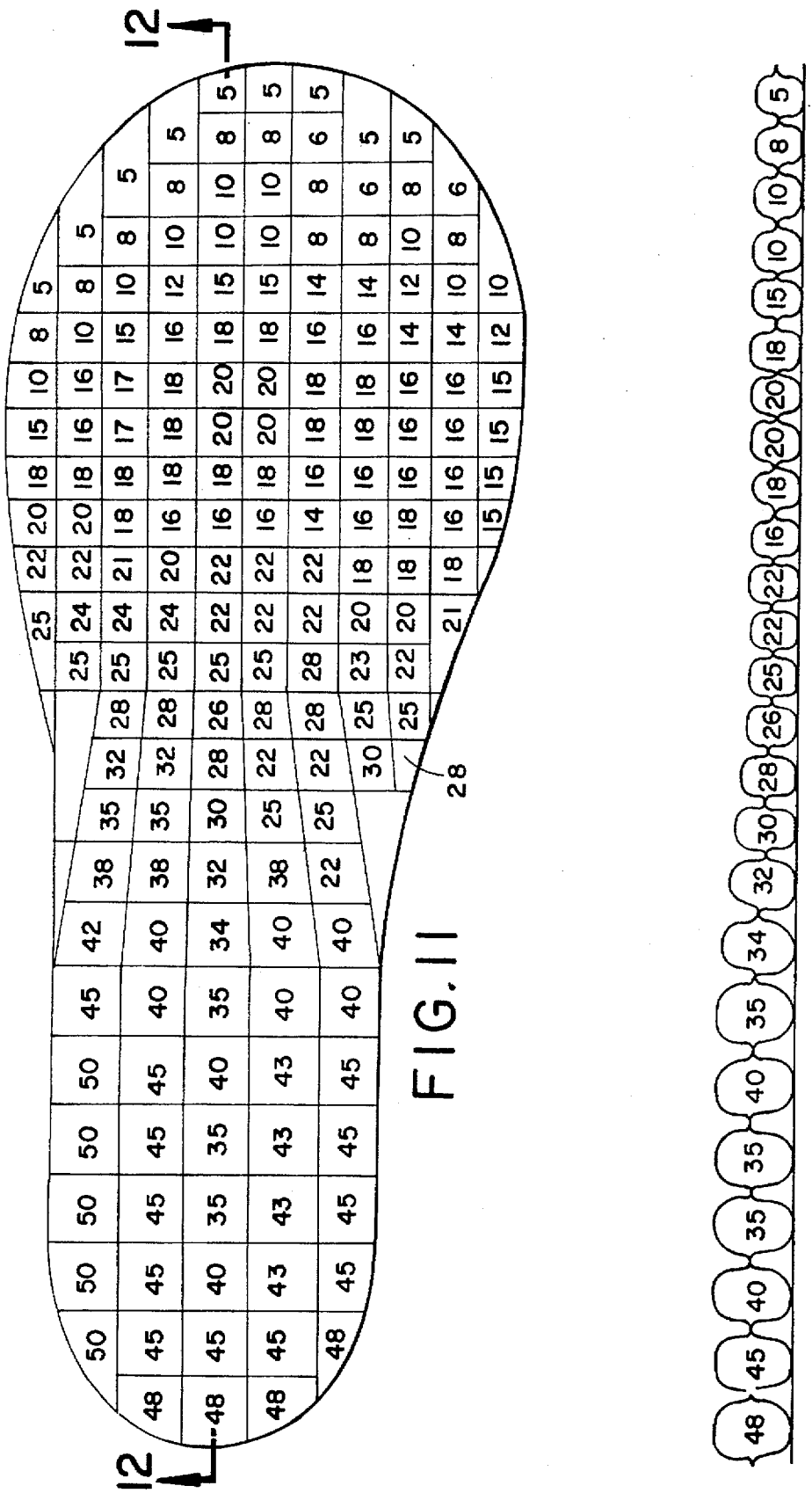
FIG. 11 is a top plan view of a schematic footsole cushion of a type in accord with the present invention.
FIG. 12 is a cross-sectional view taken along lines 12—12 of FIG. 11.

FIGS. 11 and 12 show a full length version of an inflated cushion which can be constructed in accord with this invention. This version includes a plurality of varied pressure cells to provide a customized superior cushion for footwear. A wide variety of customized cushioning devices can be easily manufactured to precisely meet the static and dynamic requirements of any sport, various types of foot-plants, etc. using empirical information from force plates and representative mathematical models, to determine the best pressure in each incremental cushioning element to achieve the overall optimum cushioning performance and technical characteristics for that specific application, or for a specific athlete.

In FIG. 11, the cushion is shown with all cells closed off from one another at various pressures. However, certain groups of cells may be left in communication with one another for certain applications. The appropriate distributions of high, low, and medium pressures can be used in individual cells to create a pattern of support performance and comfort to match the needs of various portions of the plantar area of the foot. Thus, for example, the calcaneus and longitudinal arches can be given added support, and the metatarsals more comfortably dynamically and anatomically cushioned.

Figure 15A:
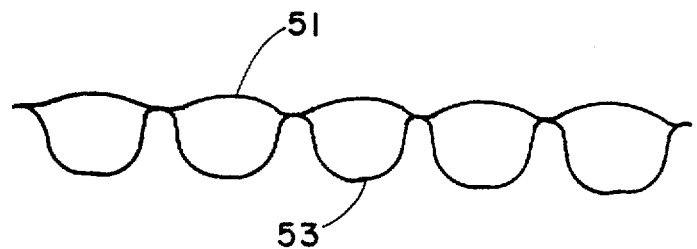
FIG. 15A–15B are alternative embodiment cushions according to the present invention.
Figure 15B:
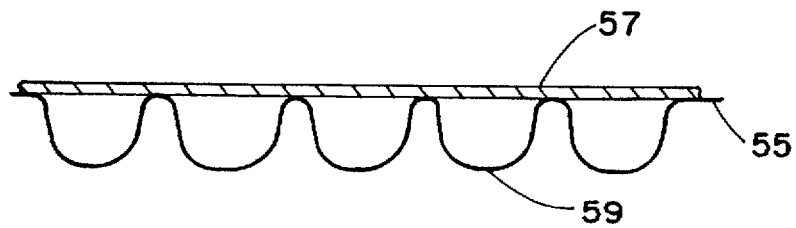

FIG. 15A shows a sectional view of a half sphere or tube cushion. The cushion of FIG. 15A is formed by welding a flat sheet upper portion 51 of elastomeric material to a preformed cellular bottom sheet 53. Upon inflation, both top and bottom portions expand, with the top sheet expanding less than the bottom sheet.

If a completely flat surface is desired (as in FIG. 15B), it can be achieved by first laminating a flat sheet of elastomeric envelope film 55 to another layer of material 57 having higher modulus of elasticity (for example "Texin" available from Mobay Chemical Co.). Subsequently this assembly is then heat-sealed to a preformed cellular bottom portion 59.

As demonstrated by FIGS. 9, 16, 17, 18 and 20 the inventive cushion is also well suited to use in a variety of shock absorbing environments. Particularly, the cushion can be utilized in a bicycle seat, in the handle of a tennis racquet, as a lining of a helmet, and as a brace.

Thus, it is apparent that there has been provided, in accordance with the invention, a cushion and method of its manufacture that full satisfies the objects, aims, and advantages set forth above. While the invention has been described in conjunction with specific embodiments thereof, it is evident that many alternatives, modifications, and variations would be apparent to those skilled in the art in light of the foregoing description. Accordingly, it is intended to embrace all such alternatives, modifications, and variations as fall within the spirit and broad scope of the appended claims.

Having described the foregoing invention, I claim:

1. A process for manufacture of a cushioning device, said process comprising the steps of:
   (a) placing an elastomeric member between first and second cooperative die members;
   (b) forming at least two distinct cells having a fluid communication passage between said at least two cells in said elastomeric member;
   (c) temporarily limiting the volume of at least one of said cells to a greater extent than said other cell;
   (d) filling said cells with a single fluid pressure from a single injection point; and,
   (e) sealing said passage while performing step (c) and after completion of step (d).

2. The process of claim 1 wherein said elastomeric member is blow-molded into said cooperative dies.

3. The process of claim 1 wherein said elastomeric member is vacuum and/or pressure formed between said first and second die members.

4. The process of claim 1 wherein said elastomeric member comprises a preformed, at least partially sealed elastomeric body.

5. The process of claim 1 wherein at least one of said die members has recesses to house said cells.

6. The process of claim 1 wherein at least one cell is filled with said fluid to achieve a pressure from between greater than 0 psi and 50.

7. The process of claim 1 wherein step (c) is initiated before step (d) is performed.

8. A process for manufacture of a cushioning device, said process comprising the steps of:
   (a) placing an elastomeric member between first and second cooperative die members;
   (b) forming at least two distinct cells having a fluid communication passage between at least two cells in said elastomeric member;
   (c) temporarily limiting the volume of at least one of said cells to a greater extent than said other cell;
   (d) filling said cells with a fluid;
   (e) sealing said passage while performing step (c), and;
   (f) ending said temporary volume limiting of step (c) causing said cells to expand such that at least several cells are at different pressures.

9. The process of claim 1 wherein step (d) is performed before step (c) is initiated.

10. A process of manufacturing a multi-cellular cushioning device comprising forming an elastomeric body having a plurality of cells in fluid communication via passages, filling said cells with a fluid to a single pressure from a single inflation point, temporarily adjusting the volume of said cells to different amounts, simultaneously sealing at least several passages to achieve a multi-celled cushion having a plurality of cells no longer in fluid communication at several different pressures.

* * * * *